March 27, 1956 R. KAISER 2,739,374
METHOD OF MAKING SEALING SURFACE
Filed June 23, 1950
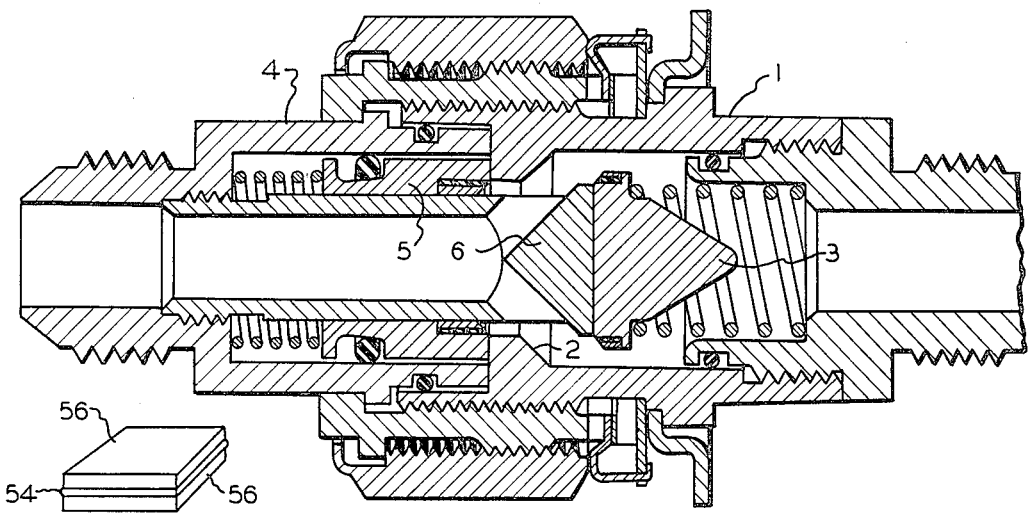
FIG. I.
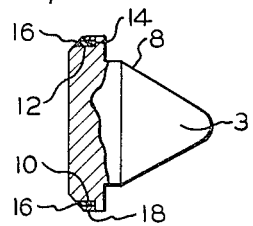
FIG. IX.
FIG. II.
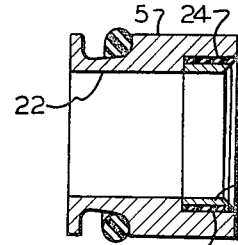
FIG. III.
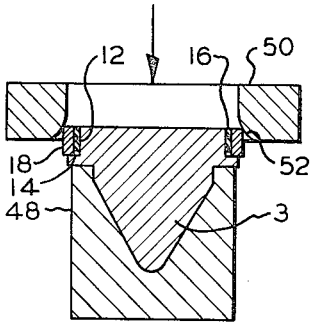
FIG. VIII.
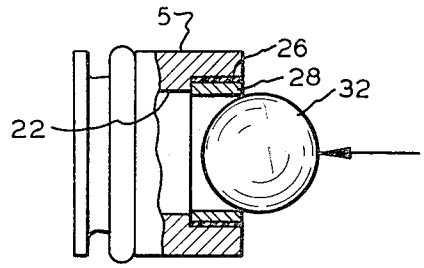
FIG. IV.
FIG. VII.
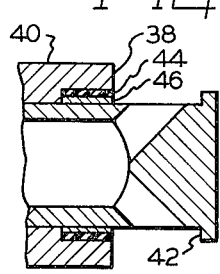
FIG. V.
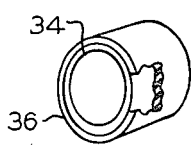
FIG. VI.
INVENTOR
RUDOLF KAISER
BY Townsend P. Beaman
ATTORNEY

United States Patent Office 2,739,374
Patented Mar. 27, 1956

2,739,374

METHOD OF MAKING SEALING SURFACE

Rudolf Kaiser, Ettlingen, Baden, Germany, assignor to Aeroquip Corporation, Jackson, Mich., a corporation of Michigan Application June 23, 1950, Serial No. 169,895

1 Claim. (Cl. 29—450)

The present invention relates to improvements in sealing surfaces wherein two surfaces are engaged to form a fluid seal.

It is the practice to use rubber, both natural and synthetic, or its equivalent, in providing fluid seal. While relatively incompressible, such material will flow or become displaced under high pressure. Also, in shapes and dimensions heretofore used, swelling of the material under the action of gasoline, oil and other fluids, has been objectionable.

According to the present invention, I propose a seal in which rubber, natural or synthetic, plastics, and other suitable material characterized by having properties similar to rubber as to density, relative incompressibility and elasticity, is presented in extremely thin sections as compared with all prior practice of which I have knowledge. Where an annular seal is desired, the rubber may be in the form of a very thin walled tube. This tube is then confined, under relatively high pressure, between two parts, preferably by expanding one part onto or into the other with the tube between them. Thereafter, the assembly is machined or otherwise dressed or treated to provide a surface in which the rubber or its equivalent is confined in an extremely thin section between the two parts with the exposed surface of the rubber protruding beyond the immediately adjacent and confining portion of the parts in the order of .001 inch. In practice the amount of protuberance of the seal material beyond the confining parts is that which will normally result from a turning operation with a relatively sharp tool to provide the desired surface after the parts and tube are assembled.

I have found that with the rubber sealing surface protruding beyond the surface of the confining part to the degree above indicated, difficulties heretofore experienced with swelling and flow of the sealing material are obviated. This is apparently due to the fact that only an extremely limited amount of sealing material is exposed and functioning in connection with the sealing operation.

Thus, the object of the invention is to provide an improved sealing structure of the character above described and a method of obtaining the same.

In the drawings,

Fig. I is a cross-sectional view of a self-sealing coupling for fluids in which the principles of the present invention have been embodied, Fig. II shows a valve head to which the invention has been applied, Fig. III is a cross-sectional view of a valve seat involving the present invention, Fig. IV is a cross-sectional view of the assembly shown in Fig. III prior to the expansion and machining steps, Fig. V is a fragmentary cross-sectional view shown on an enlarged scale illustrating the protuberance of the sealing material, Fig. VI is a perspective view of an expanding ring having embracing exterior layer of sealing material applied thereto, Fig. VII is a cross-sectional view through a valve seat assembly showing the invention applied to a plane surface, Fig. VIII illustrates a method of shrinking on with the parts of the valve head shown in Fig. II upon the sealing material, and Fig. IX shows the principles of the invention applied to linear seal.

The principles of the invention have been illustrated in Fig. I in connection with the valve of a separable, self-sealing coupling of the type disclosed in U. S. Patent No. 2,208,286. It is to be understood, however, that the invention is of broad application with its use adaptable to sealing surfaces in general wherein two surfaces are engaged to form a fluid seal.

As shown, the coupling part 1 has a valve 2 adapted to engage with the seat 3 while the coupling part 4 has a valve part 5 adapted to engage with a valve seat 6.

In Fig. II, the valve 3 is shown removed from the assembly and in vertical cross-section. As shown, the valve 3 comprises a main body portion 8 machined with a step 10 providing a cylindrical portion at 12 and an annular ledge at 14. A rubber tube portion 16 is of relatively thin-walled construction. It may be initially assembled upon the cylindrical portion 12 by being slipped over or stretched upon the same. The outer ring or sleeve 18 may be press fitted or expanded upon the cylindrical portion 12 with the rubber tube 16 disposed between the ring 18 and the main body portion 8.

In the valve part 5 shown in Fig. III, the main body portion, as in the case of the valve 3, may be of metal or other suitable structure and has a bore 22 counterbored at 24. A rubber tube 26, which may correspond to the tube 16, is inserted into the counterbore 24. The sleeve 28, which is preferably of metal, is inserted within the tube 26 and is then expanded into the counterbore 24 in any suitable manner to confine the tube 26 under pressure within the body 20.

In Fig. IV the manner in which the parts constituting the sealing surface of the valve 5 may be assembled is illustrated. Prior to the machining operation which provides the conical sealing surface 30, with the rubber tube 26 and sleeve 28 in position, a ball 32, or other suitable expanding structure, is forced through the sleeve 28 to expand the same. In practice the diameter of the ball 32 would conform substantially to that of the bore 22. Prior to expansion the internal diameter of the sleeve 28 is sufficiently less than the diameter of the ball 32 whereby the expansion of the ring 28 in the counterbore 24 is adequate to exert relatively high pressure upon the rubber tube 26 and one tending to displace a portion of the rubber material, or its equivalent, from between the counterbore 24 and the ring 28. Following expansion by the ball 32, the sealing surface 30 is machined using a relatively sharp tool capable of cutting the rubber tube 26 substantially flush with the metal parts, between which it is confined, as will be more fully described.

In Fig. V the sealing surface 30 has been greatly enlarged to show the relationship of the machined edge of the rubber tube 26 with respect to the adjacent confining parts. Following the machining operation of the face 30, during which some of the material of the tube 26 is forced slightly to the right as seen in Fig. V, the inherent elasticity of the material constituting the tube 26 results in the slight protuberance indicated at 33. For purposes of illustration, the protuberance 33 has been greatly exaggerated as will be apparent from the fact that in actual practice the amount of protuberance of the material of the tube 26 beyond the adjacent machined surfaces is in the order of .001 inch.

It will be understood that in the engagement of the surface 30 with the valve seat, the first contact would be with the protruding end of the rubber tube 26 with metalto-metal contact only resulting upon the exertion of relatively high pressure.

In the forms of the invention described in Figs. I to V, inclusive, the thin section of protruding sealing material was described as being associated to the assembly as a separate part. In Fig. VI is shown a composite expanding sleeve and seal in which the sealing material, in the form of natural rubber or synthetic, or other suitable plastic material, is affixed to the outside diameter of the cylindrical expansible sleeve 34 in the form of a layer 36 which may be applied by spraying, dipping or merely stretched over the sleeve 34 and held in position by contraction of the material. It is also anticipated that the rubber, or its equivalent, may be vulcanized or otherwise bonded to the outer surface of the sleeve 34.

A further modification of the invention is shown in Fig. VII wherein the sealing surface 38 of the valve part 40, which engages with the valve seat 42, is disposed in a plane at right angles to the longitudinal axis of the valve part in contrast to the conical surface 30 of the form shown in Fig. III. It is to be understood that the thin wall sealing ring 44 may be assembled and held in position by the expansible sleeve 46 in a manner similar to that heretofore described with reference to Figs. I to V, inclusive. The degree of protuberance of the edge of the tube or sealing ring 44 beyond the surface 38 will correspond to that described with reference to the protuberance 33 of Fig. V.

Fig. VIII illustrates one manner in which the ring 18 of Fig. III may be contracted upon the sealing ring or tube 16. As shown, with the parts assembled upon the cylindrical portion 12 of the valve 3, the valve 3 is backed up in a suitable fixture 48. A sizing ring 50 is chamfered at 52 and then pressed down over the ring 18 to contract the same, all in a well known manner. To avoid any tendency for the rubber tube 16 to force the contracted ring 18 outwardly with reference to its finally assembled position, it has been found advisable to provide a slight amount of clearance between the ring 16 and the annular ledge 14. It is to be understood, however, that this clearance is extremely slight and is in the order of .001 inches.

As the principles of the invention are not confined to fluid seals in which the protruding sealing material is in the form of an annulus, I have illustrated in Fig. IX a structure in which a linear seal is provided by confining a thin wall sealing material 54 between parts 56 and 58 which may be held together in any suitable manner.

I claim:

A method of making a sealing surface for fluids comprising the steps of positioning a thin section of elastic, displaceable and relatively non-compressible material, comparable to rubber, between a pair of parts, relatively displacing said parts toward each other to apply pressure to said thin section and to displace the material thereof edgewise, and then simultaneously compressively dressing said section and adjacent confining parts to present a sealing surface with said material protruding slightly beyond the dressed surface following the dressing operation thereon.

References Cited in the file of this patent

UNITED STATES PATENTS

| Number | Name | Date |
|---|---|---|
| 391,079 | Rinker | Oct. 16, 1888 |
| 610,744 | Henion | Sept. 13, 1898 |
| 1,003,179 | Gruschow | Sept. 12, 1911 |
| 1,033,325 | Keiser | July 23, 1915 |
| 1,882,433 | MacClatchie | Oct. 11, 1932 |
| 1,939,242 | Thaheld | Dec. 12, 1933 |
| 1,948,628 | Penick | Feb. 27, 1934 |
| 1,966,264 | Roye | July 10, 1934 |
| 2,182,278 | Brauer | Dec. 5, 1939 |
| 2,372,629 | Nelson | Mar. 27, 1945 |
| 2,499,241 | Courtot | Feb. 28, 1950 |